(12) United States Patent
Seetzen et al.

(10) Patent No.: US 10,264,225 B2
(45) Date of Patent: Apr. 16, 2019

(54) OPTICAL MIXING AND SHAPING SYSTEM FOR DISPLAY BACKLIGHTS AND DISPLAYS INCORPORATING THE SAME

(71) Applicant: Dolby Laboratories Licensing Corporation, San Francisco, CA (US)

(72) Inventors: Helge Seetzen, Westmount (CA); Lorne A. Whitehead, Vancouver (CA); Gregory John Ward, Berkeley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 108 days.

(21) Appl. No.: 15/277,981

(22) Filed: Sep. 27, 2016

(65) Prior Publication Data

US 2017/0019646 A1    Jan. 19, 2017

Related U.S. Application Data

(63) Continuation of application No. 14/254,401, filed on Apr. 16, 2014, now Pat. No. 9,462,240, which is a continuation of application No. 13/859,113, filed on Apr. 9, 2013, now Pat. No. 8,733,960, which is a continuation of application No. 13/386,227, filed as
(Continued)

(51) Int. Cl.
| | |
|---|---|
| *F21V 8/00* | (2006.01) |
| *G02B 5/32* | (2006.01) |
| *G09G 3/34* | (2006.01) |
| *H04N 9/31* | (2006.01) |
| *G03B 21/20* | (2006.01) |

(Continued)

(52) U.S. Cl.
CPC ............ *H04N 9/3138* (2013.01); *G02B 5/32* (2013.01); *G02B 6/0005* (2013.01); *G02F 1/1335* (2013.01); *G02F 1/133605* (2013.01); *G02F 1/133609* (2013.01); *G03B 21/208* (2013.01); *G03B 21/2033* (2013.01); *G02F 2001/133601* (2013.01); *G09G 3/3426* (2013.01); *G09G 2320/0238* (2013.01)

(58) Field of Classification Search
CPC .... G03B 21/208; G03B 21/2033; G02B 5/32; G02B 6/0005; G02F 1/1335; G02F 1/133606; H04N 9/3138; G09G 2320/0238; G09G 3/3426
See application file for complete search history.

(56) References Cited

U.S. PATENT DOCUMENTS 6,317,263 B1 * 11/2001 Moshrefzadeh ..... G03B 21/625
                                                               359/443
6,655,825 B2    12/2003  Muthu
(Continued)

FOREIGN PATENT DOCUMENTS

JP         2002-099250         4/2002

*Primary Examiner* — Peggy A Neils

(57) ABSTRACT

A backlight for a display comprises a plurality of independently controllable light sources and inclined surfaces inclining in a radially outward direction from each light source for shaping the distribution of emitted light. The light sources may each comprise a group of differently-colored light emitters. The backlight may include light integrators configured to mix light of the differently-colored light emitters. Inclined surfaces for shaping the distribution of emitted light may be arranged around exits of the light integrators.

20 Claims, 6 Drawing Sheets

Related U.S. Application Data application No. PCT/US2010/046280 on Aug. 23, 2010, now Pat. No. 8,434,887.

(60) Provisional application No. 61/237,659, filed on Aug. 27, 2009.

(51) Int. Cl.
*G02F 1/335* (2006.01)
*G02F 1/1335* (2006.01)

(56) References Cited

U.S. PATENT DOCUMENTS

| | | | |
|---|---|---|---|
| 6,791,636 B2 | 9/2004 | Paolini | |
| 6,987,599 B2 | 1/2006 | Sandstrom | |
| 7,370,979 B2 * | 5/2008 | Whitehead | H01J 63/06 |
| | | | 345/207 |
| 7,385,653 B2 | 6/2008 | Kim | |
| 7,397,601 B2 * | 7/2008 | Laudo | B01L 9/06 |
| | | | 359/368 |
| 7,403,332 B2 | 7/2008 | Whitehead | |
| 7,872,659 B2 | 1/2011 | Seetzen | |
| 8,059,340 B2 * | 11/2011 | Khan | H04N 9/3161 |
| | | | 359/619 |
| 8,212,741 B2 | 7/2012 | Raman | |
| 8,217,970 B2 | 7/2012 | Whitehead | |
| 8,272,771 B2 * | 9/2012 | Arai | G02B 6/0016 |
| | | | 362/608 |
| 8,366,281 B2 * | 2/2013 | Silverstein | G02B 27/48 |
| | | | 353/101 |
| 8,403,494 B2 * | 3/2013 | Kojima | G03B 21/20 |
| | | | 353/38 |
| 2004/0062040 A1 | 4/2004 | Blume | |
| 2005/0248593 A1 | 11/2005 | Feng | |
| 2005/0259195 A1 | 11/2005 | Koganezawa | |
| 2006/0291203 A1 | 12/2006 | Anandan | |
| 2007/0052662 A1 | 3/2007 | Kim | |
| 2007/0052663 A1 | 3/2007 | Kim | |
| 2007/0153866 A1 * | 7/2007 | Shchegrov | G02B 27/102 |
| | | | 372/50.124 |
| 2007/0247833 A1 | 10/2007 | Lee | |
| 2008/0068860 A1 | 3/2008 | Peng | |
| 2009/0097230 A1 | 4/2009 | Masuda | |
| 2009/0161033 A1 * | 6/2009 | Kaise | H04N 9/3108 |
| | | | 349/8 |
| 2009/0174638 A1 | 7/2009 | Brown Elliott | |
| 2009/0213294 A1 | 8/2009 | Jung | |
| 2010/0061087 A1 | 3/2010 | Stevens | |
| 2010/0289836 A1 | 11/2010 | Whitehead | |

\* cited by examiner

US 10,264,225 B2

OPTICAL MIXING AND SHAPING SYSTEM FOR DISPLAY BACKLIGHTS AND DISPLAYS INCORPORATING THE SAME

CROSS-REFERENCE TO RELATED APPLICATIONS

This application is a continuation of U.S. patent application Ser. No. 14/254,401 filed on Apr. 16, 2014, which is a continuation of U.S. patent application Ser. No. 13/859,113 filed on Apr. 9, 2013 (now U.S. Pat. No. 8,733,960 issued May 27, 2014), which is a continuation of U.S. patent application Ser. No. 13/386,227 filed on Jan. 20, 2012 (now U.S. Pat. No. 8,434,887 issued May 7, 2013), which is a U.S. 371 application of International Patent Application No. 61/237,659 filed on Aug. 27, 2009, all of which are hereby incorporated by reference.

TECHNICAL FIELD OF THE INVENTION

This invention relates generally to backlit displays and to backlights for such displays.

BACKGROUND OF THE INVENTION

Some displays, such as liquid crystal displays (LCDs), comprise a spatial light modulator that is illuminated by a backlight. Light from the backlight interacts with the spatial light modulator which spatially modulates the light so as to present images to a viewer. The images may be still images or video images for example. The spatial light modulator may comprise an array of controllable pixels.

In some such displays, the backlight includes multiple light-emitting devices, such as LEDs, for illuminating regions of the spatial light modulator. Such light-emitting devices or groups of such light-emitting devices may be separately controllable so that the intensity of light emitted by the backlight can be made to vary in a desired way over the spatial light modulator. Such displays are referred to herein as dual-modulation displays. Some examples of dual modulation displays are described in: U.S. Pat. No. 7,403,332, issued on Jul. 22, 2008 and U.S. Pat. No. 8,217,970, issued on Jul. 10, 2012, which are hereby incorporated herein by reference for all purposes.

A challenge associated with dual-modulation displays is to provide a backlight capable of providing illumination having an intensity and/or spectral composition that varies in a desired way from point to point on the spatial light modulator.

SUMMARY OF THE INVENTION

One aspect of this invention provides displays. The displays may comprise, for example, computer displays, televisions, video monitors, home cinema displays, stadium displays, specialized displays such as displays for medical imaging, virtual reality, 3-D displays, or the like. Another aspect of the invention provides backlights for displays.

In addition to the exemplary aspects and embodiments described above, further aspects and embodiments will become apparent by reference to the drawings and by study of the following detailed descriptions.

BRIEF DESCRIPTION OF DRAWINGS

Example embodiments are illustrated in the accompanying drawings. The embodiments disclosed herein are illustrative and are not intended to be restrictive.

DESCRIPTION OF THE INVENTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
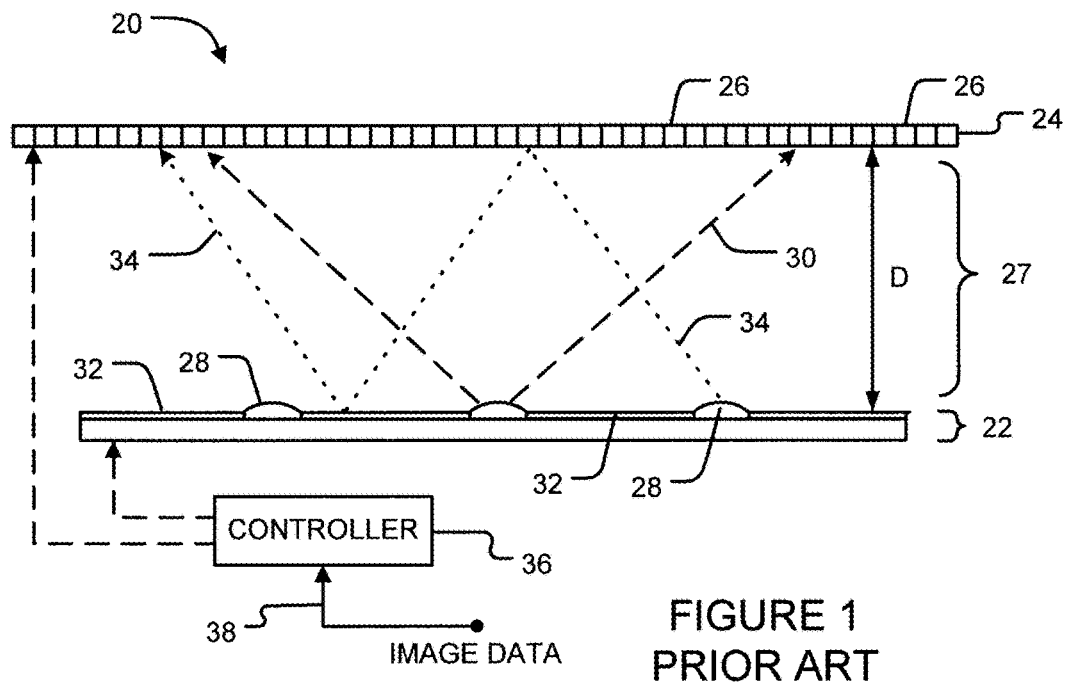
FIG. 1 is a partial cross-section schematic view of a display having a backlight with a flat reflecting surface.

FIG. 1 is a schematic cross-section view of a display 20 of a general construction known in the prior art. Display 20 has a backlight 22 which illuminates an LCD panel 24. LCD panel 24 comprises an array of pixels 26 which can be controlled to pass varying amounts of the light incident on them to a viewing area.

Backlight 22 comprises a plurality of individually-controllable light-emitting diodes (LEDs) 28. Each LED 28, when on, illuminates an area of LCD panel 24 after passing through region 27. Light emitted from LEDs 28 spreads out as it crosses region 27, as illustrated for example by dotted line 30. Light from each of the LEDs 28 spreads out according to a point spread function (PSF) dependent on the characteristics of the LED as well as the characteristics and geometry of region 27.

It is generally desirable that LEDs 28 be capable of evenly illuminating LCD panel 24 or smoothly varying the brightness of illumination from place to place across LCD panel 24 in response to image data. Gaps or sharp transitions in illumination may produce undesirable visible artifacts. In the display 20 shown in FIG. 1, relatively even illumination is achievable by ensuring that light from neighboring LEDs 28 overlaps at LCD panel 24. This, in turn, is achieved by providing a suitable distance D between LEDs 28 and LCD panel 24. Distance D sets a lower limit on the thickness of display 20. The greater distance D, the more light from different LEDs 28 may overlap. When light from LEDs of different colors is combined at LCD panel 24, this overlapping of light may also allow for greater mixing of the different colors of light before they impinge on LCD panel 24.

As illustrated by light ray 34 in FIG. 1, some portion of light incident on LCD panel 24 may be reflected back toward backlight 22 rather than entering LCD panel 24 as ideally is desired. To avoid inefficient dissipation of such reflected light, backlight 22 may be coated with or made to have a reflective surface 32 to reflect light back toward LCD panel 24. In display 20, surface 32 is substantially flat and therefore light reflects off it in a direction away from the originating light source, as illustrated by light ray 34. Such reflected light may eventually enter LCD panel 24 at a location considerably far from the primary target area of its originating light source (where the primary target area of a light source is that area of the LCD panel that is closer to that light source than any other light source).

Display 20 comprises a controller 36 that controls the intensity of light emitted by LEDs 28 and also the transmissivity of pixels 26 of LCD panel 24 in response to image data received at an input 38.

One drawback to light spreading or reflecting significantly beyond its primary target area on a spatial light modulator (as illustrated for example by light rays 30 and 34 in FIG. 1) is that it compromises the ability to locally control the brightness of light incident on the spatial light modulator in a desired way. The more widely that light from different light sources on a backlight spreads to overlap with light from other light sources, the more difficult it becomes to independently control the brightness at specific areas of the spatial light modulator. The inventors have determined that, in certain applications of dual-modulation displays, it is generally desirable that light from each light source overlaps somewhat but not too much with light from other sources.

For example, one intended benefit of dual-modulation displays is that they be capable of producing purer blacks in displayed images than conventional displays, and hence provide improved contrast ratios. Typically, a spatial light modulator (SLM) such as an LCD display allows some incident light to leak through to a viewer even when it is controlled to block light to produce a black image. Thus, a backlit SLM controlled to appear black may appear dark brown or grey to a viewer, rather than pure black as desired. A truer black is achievable over an area of an SLM if the backlight is controllable to not illuminate that area of the SLM (e.g. if the backlight is locally dimmed). For example, where an image contains a dark area on a bright background, a dual-modulation display would ideally be capable of brightly illuminating the areas of the SLM corresponding to bright portions of the image while not illuminating (or not significantly illuminating) areas of the SLM corresponding to dark portion of the image. This in turn should be controllable by turning on and off and/or controlling the intensities of appropriate light sources on the backlight. However, the more that light from each light source can spread to illuminate neighboring dark areas of the SLM, the less that such dark areas will appear pure black in the resulting image.

Figure 2:
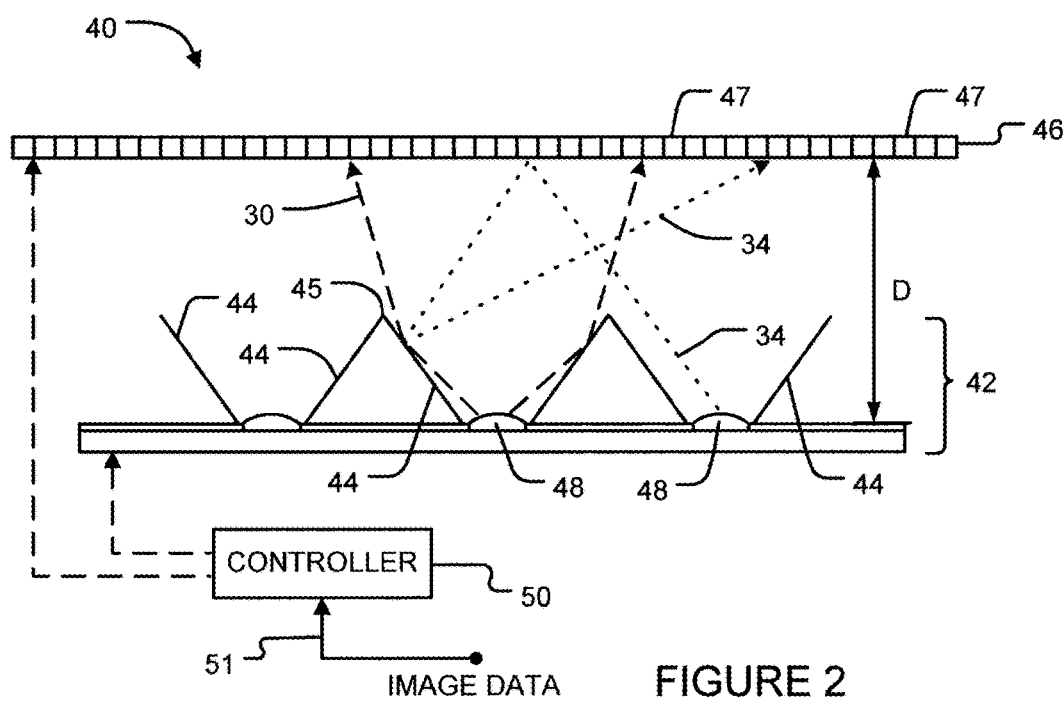
FIG. 2 shows a partial cross-section schematic view of a display having a backlight with inclined reflecting surfaces according to an example embodiment of the present invention.

FIG. 2 shows a display 40 having a backlight 42 that illuminates a spatial light modulator 46. Spatial light modulator 46 comprises an array of individually-controllable elements or pixels 47 which can be controlled to pass varying amounts of the light incident on them to a viewing area. Each pixel 47 of spatial light modulator 46 may have a plurality of addressable sub-pixels associated with corresponding color filters. The sub-pixels are controllable to vary the amount of light of each color that is passed to a viewer. Spatial light modulator 46 may, for example, comprise a reflection-type spatial light modulator or a transmission type spatial light modulator. By way of example, spatial light modulator 46 may comprise a liquid crystal display (LCD) panel. The display panel may be, for example, an RGB or RGBW display panel. In other example embodiments, spatial light modulator 46 may comprise a liquid crystal on silicon (LCOS) or other suitable reflective-type or transmission spatial light modulator.

Backlight 42 comprises a plurality of individually-controllable light sources 48. Each light source 48, when on, illuminates an area of spatial light modulator 46. Each light source comprises one or more light-emitting devices such as LEDs, plasma light emitters, cold cathode light emitters, light-emitting semiconductor junctions. or the like. In display 40, the surface of backlight 42 is ridged rather than level around light sources 48. As illustrated, each light source 48 is surrounded on all sides by inclined surfaces 44 such that each light source 48 is in a cavity 44A formed by inclined surfaces 44. In preferred embodiments, the surface of backlight 42 comprises a repeating pattern of inclined surfaces 44 that tile the backlight 42.

In some embodiments, each cavity 44A hosts a light source 48. The inclined surfaces 44 of adjacent light sources 48 meet at apexes 45. Preferably, inclined surfaces 44 are at no points parallel to spatial light modulator 46 and thus apexes 45 are discontinuous. In some embodiments, the slope of inclined surfaces 44 remains substantially constant. In other embodiments, the slope of inclined surfaces 44 becomes steeper toward an apex 45. The height of inclined surfaces 44 relative to distance D may vary. The elevation of inclined surfaces 44 is not drawn to scale in FIG. 2.

Figure 3A:
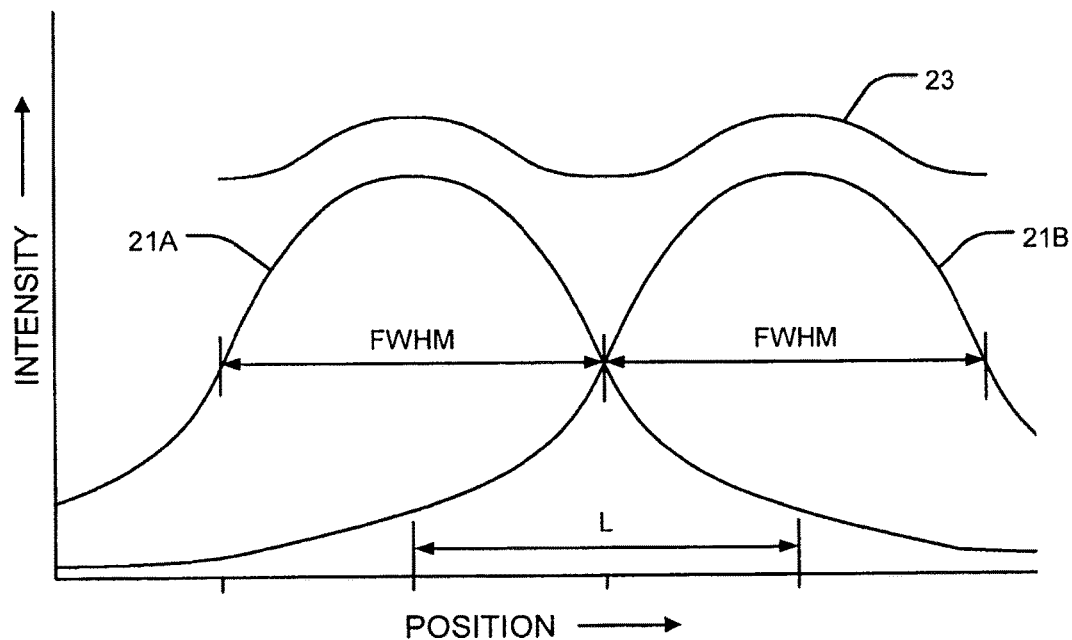
FIG. 3A illustrates overlapping point spread functions of adjacent light sources in a display like that of FIG. 1.
Figure 3B:
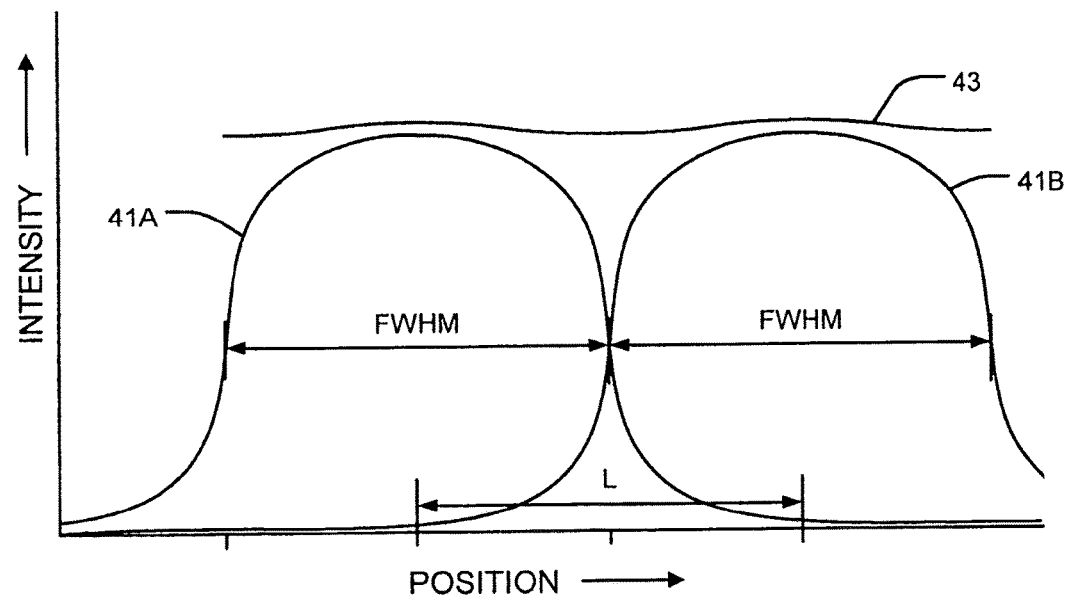
FIG. 3B illustrates the overlapping point spread functions of adjacent light sources in a display like that of FIG. 2.

As illustrated in FIG. 2, inclined surfaces 44 are reflective. A purpose of inclined surfaces 44 is to increase the proportion of the light emitted from a given light source 48 that is contained within a corresponding target area of spatial light modulator 46. Inclined surfaces 44 shape the point spread function of light sources 48 so that the distribution of light across spatial light modulator 46 is more flat within the target area and more attenuated beyond the target area (as illustrated in FIGS. 3A and 3B described further below). For example, as illustrated by light rays 30, inclined surfaces 44 in display 40 cause wide-spreading light rays to be deflected inward toward spatial light modulator 46 at a narrower angle than they would otherwise have. Also, as illustrated by light ray 34, inclined surfaces 44 in display 40 cause any light reflected back toward backlight 42 to be re-directed back toward the desired target area of spatial light modulator 46 of its originating light source.

Figure 6A:
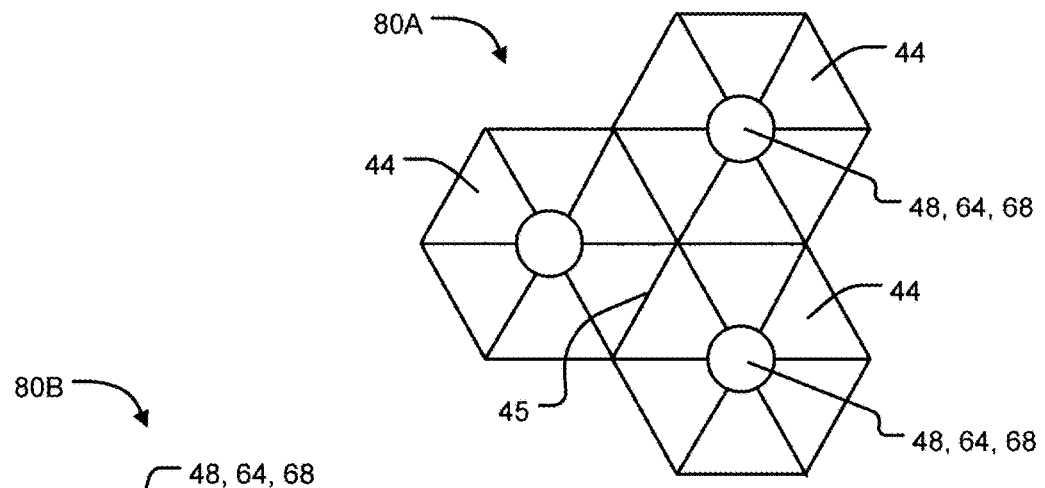
FIGS. 6A-6D show schematic partial plan views of backlights illustrating various configurations of light sources and inclined surfaces according to embodiments of the present invention.

FIGS. 6A-6D show partial plan views of backlights 80A-80D respectively, illustrating some example configurations of the surface of backlights according to embodiments of the present invention. In each example, light sources 48 are each surrounded by one or more inclined surfaces 44 in a repeating pattern that may tile the entire backlight. FIG. 6A illustrates a backlight 80A having a hexagonal configuration, wherein six inclined surfaces 44 form a hexagonal cavity around each light source 48. As shown, such hexagonal cavities may be arranged together in a continuous tiled pattern across backlight 80A. Inclined surfaces 44 of adjacent hexagonal cavities meet at apexes 45.

Figure 6B:
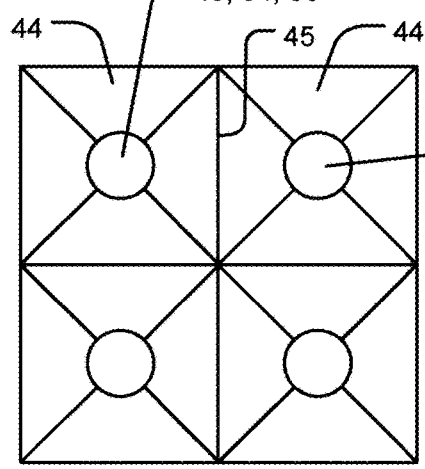
Figure 6C:
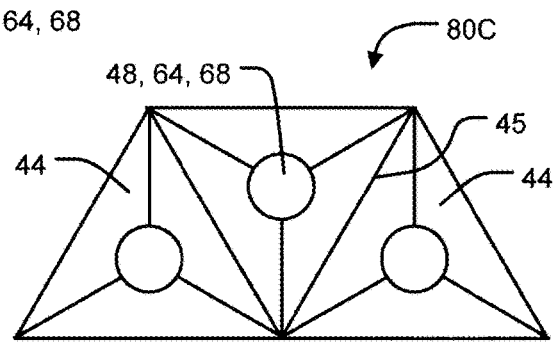
Figure 6D:
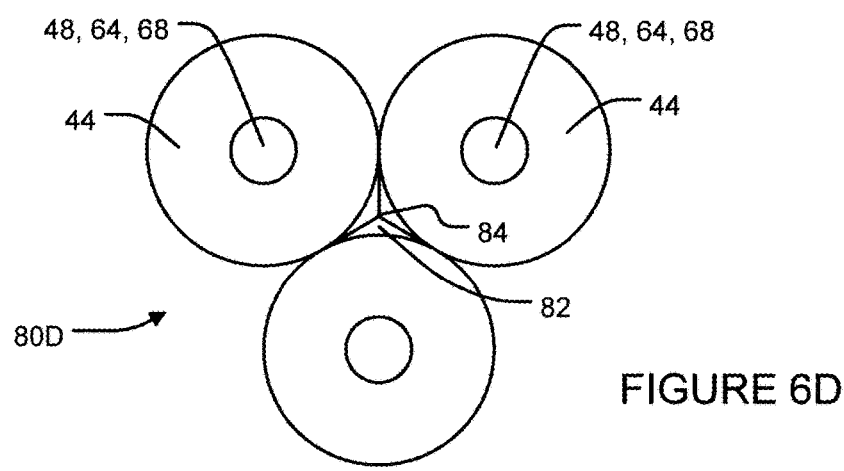
Figure 7:
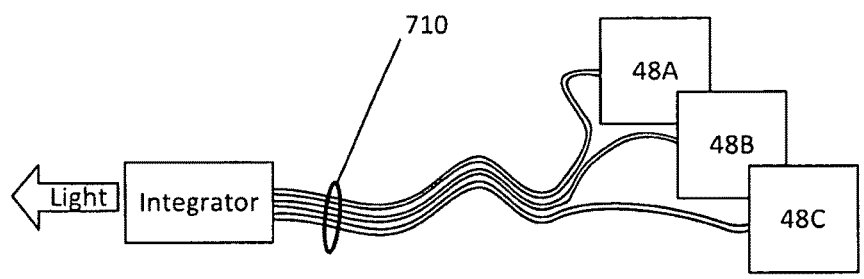
FIG. 7 illustrates a bundle of fibers 710 coupled between the emitters and the light integrator.

Similarly, FIG. 6B illustrates a backlight 80B having a square configuration and FIG. 6C illustrates a backlight 80C having a triangular configuration (wherein inclined surfaces 44 form a square or triangular cavity around each light source 48 respectively). As shown, such square or triangular cavities may also be arranged together in a continuous tiled pattern across the backlights with inclined surfaces 44 of adjacent cavities meeting at apexes 45. FIG. 6D illustrates a backlight 80D having a circular configuration, wherein a single curved inclined surface 44 forms a conical cavity around each light source 48. A drawback of this configuration is that such conical cavities do not tile over the entire area of backlight 80D. In this case, a ridge 82 may be used to cover the gaps between adjacent conical cavities. As illustrated, ridge 82 may have three inclined faces joining at an apex 84.

Light sources 48 and inclined surfaces 44 may be arranged on backlights in configurations other than those illustrated in FIGS. 6A-6D. It is not necessary for example that light sources 48 be round as illustrated. It is not necessary that inclined surfaces 44 be arranged in any particular repeating geometric pattern across the backlight. Generally, light sources 48 are positioned so as to provide sufficient light to illuminate the entire area of a spatial light modulator, and inclined surfaces 44 are configured to confine the spread of light from each light source.

Display 40 comprises a controller 50 that generates driving signals that control light sources 48 of backlight 42 to emit light having an intensity that varies spatially over the area of spatial light modulator 46. Controller 50 also generates control signals that control the pixels 47 of spatial light modulator 46. Controller 50 receives image data at an input 51 and, based on the image data, generates the control signals to cause a viewer to see images according to the image data. The image data may comprise data specifying one or more still images or data specifying a moving image (for example, a sequence of video frames). Controller 50 may comprise one or more of: logic circuits (which may be hard-wired or provided by a configurable logic device such as a field programmable gate array >FPGA'); one or more programmed data processors (for example, the data processors may comprise microprocessors, digital signal processors, programmable graphics processors, co-processors or the like); and suitable combinations thereof. A tangible storage medium may be provided that contains instructions that can cause controller 36 or components within controller 36 to be configured to provide logic functions as described herein. The tangible storage medium may, for example, comprise software instructions to be executed by one or more data processors and/or configuration information for one or more configurable logic circuits.

FIG. 3A illustrates two example point spread functions 21A, 21B (collectively PSF 21) of adjacent light sources 28 in a display like that of FIG. 1. Each PSF 21 represents the intensity of light illuminating a cross-section of a spatial light modulator when the light source is turned fully on. The full width at half maximum (FWHM) of each PSF 21 is given by the distance between the two points at which the light intensity is half its maximum value. In the illustrated embodiment, PSFs 21A and 21B are identical in shape, but spaced apart by a distance L such that they intersect around their half-maximum points. Light sources 28 are correspondingly spaced apart on their backlight by a distance L approximately equal to the FWHM of their PSF.

Curve 23 is the sum of PSFs 21A and 21B and represents the total intensity of light illuminating the given cross-section of spatial light modulator 24 (assuming that the contribution of light from other light sources is negligible). As may be seen, the overlap of the PSFs of each light source allows for a relatively constant and smoothly varying total intensity 23 across spatial light modulator 24. Spacing apart light sources 28 on backlight 22 by a distance L greater than the FWHM of their PSF would reduce the extent to which light overlaps at spatial light modulator 24 and cause total intensity 23 to dip more severely between the light sources.

Spacing apart light sources 28 on backlight 22 by a distance L much less than the FWHM of their PSF would increase the overlapping of light at spatial light modulator 24 and allow for a more smoothly varying total intensity 23 across spatial light modulator 24.

However, as discussed above, increasing the amount of overlap of light from multiple light sources along a spatial light modulator may make it more difficult to have independent localized control over the illumination of spatial light modulator 24. Also, for cost reasons, it is sometimes desirable to provide displays that do not have too many light sources. It is therefore generally desirable to limit the amount of light that overlaps between adjacent light sources, while providing a total illumination across spatial light modulator 24 that may vary smoothly. This may be achieved by shaping the PSF of each light source such that it attenuates relatively rapidly to near zero beyond its FWHM. Light from each light source is thus more confined to its particular target area of spatial light modulator.

FIG. 3B illustrates two overlapping point spread functions 41A, 41B (collectively PSF 41) of adjacent light sources 48 in a display like that of FIG. 2. As illustrated, the effect of inclined surfaces 44 is to shape the PSF curves such that light intensity is more level in the immediate vicinity of the light source, while producing a faster drop-off beyond this vicinity. In the illustrated embodiment, PSFs 41A and 41B still intersect at their half-maximum points and are still separated by a distance L equal to their FWHM, but the areas of their tail sections beyond the half-maximum points are significantly reduced as compared to PSF 21A and 21B in FIG. 3A. Thus, the spill-over of light from a given light source to the target area of other more distant light sources is significantly reduced. As well, in the illustrated embodiment, the total intensity 43 when all light emitters are on is seen to be generally more level than the equivalent total intensity 23 in FIG. 3A.

As is evident from FIG. 3B, PSF 41 of a given light source 48 overlaps with PSFs of its nearest neighboring light sources at a relatively significant ratio of its peak value (e.g. 50%), but only overlaps with the light from more distant light sources at relatively insignificant brightness levels. For example, in some embodiments, the light intensity of PSF 41 at a distance of L/2 on either side of its peak (where it intersects PSFs of neighboring light sources 48) may be greater than 45% of its peak value, while the light intensity of PSF 41 at a distance of L on either side of its peak (where it intersects PSFs of its next-nearest-neighbor light sources 48) may be less than 5% of its peak value. In other embodiments, the light intensity of PSF 41 at a distance of L/2 on either side of its peak (where it intersects PSFs of neighboring light sources 48) may be greater than 45% of its peak value, while the light intensity of PSF 41 at a distance of L on either side of its peak (where it intersects PSFs of its next-nearest-neighbor light sources 48) may be less than 1% of its peak value.

In some embodiments, controller 50 is configured to estimate the total light intensity (or light field) across spatial light modulator 46 based on a set of driving signals to light sources 48. Such light field estimation is described in principle for example in U.S. Pat. No. 7,403,332 (which is hereby incorporated by reference) as well as in US Patent Publication No. 2008/0180466.

By confining the spread of light from each light source 48 as described above, the light field estimation may be simplified. For example, in some embodiments, the total intensity of light at a given point on spatial light modulator 46 is estimated to within a sufficient degree of accuracy by taking into account just the contributions of light from the nearest light source 48 and its immediate neighbors. In other embodiments where light sources 48 are separated from their nearest neighbor by a distance L, the total intensity of light at a given point on spatial light modulator 46 is estimated by taking into account just the contributions of light from light sources 48 within a radius of that point. For example, a radius less than 2 L. If light sources 48 are arranged in a two-dimensional grid, then the light field may be estimated by taking into account just the contributions of light from the nearest nine or fewer, in some embodiments, four or fewer light sources 48.

Some embodiments of displays provide broadband white light emitters (e.g. LEDs) as the locally modulated light source in the backlight. Some embodiments provide narrow-band light emitters of multiple colors (e.g. red, green and blue LEDs in separate or integrated packages) or a combination of narrow-band and broadband emitters. Light made up of a mixture of three or more primary colors such as red, green and blue may create sensations of a wide range of colors to an observer. A benefit of using a combination of narrow-band color emitters compared to providing only broadband white emitters is that the inclusion of narrow-band emitters allows for the display of more highly saturated color images.

Saturation is a measure which takes into account intensity of light and the degree to which the light is spread across the visible spectrum. Light that is both very intense and concentrated in a narrow-band wavelength range has a high saturation. Saturation is decreased as the intensity decreases and/or the light contains spectral components distributed over a broader wavelength band. Narrow-band band light sources can advantageously provide highly saturated colors. A set of narrow-band band light sources of appropriate chromacities can provide a wide color gamut. Thus, displays having backlights providing an appropriate mix of narrow-band band light may be capable of producing color images having higher saturation than displays having backlights providing only white or broadband light.

One of the challenges with providing separate emitters for light of different colors is that the separate emitters are typically not all located in exactly the same place and so the patterns of light from the different light emitters may not be coextensive. This raises the possibility of visible artifacts such as color fringing. In some embodiments, light from differently colored emitters is optically mixed before illuminating the spatial light modulator 46. Such mixing can reduce the prevalence of such visible color artifacts in the final image.

Figure 4A:
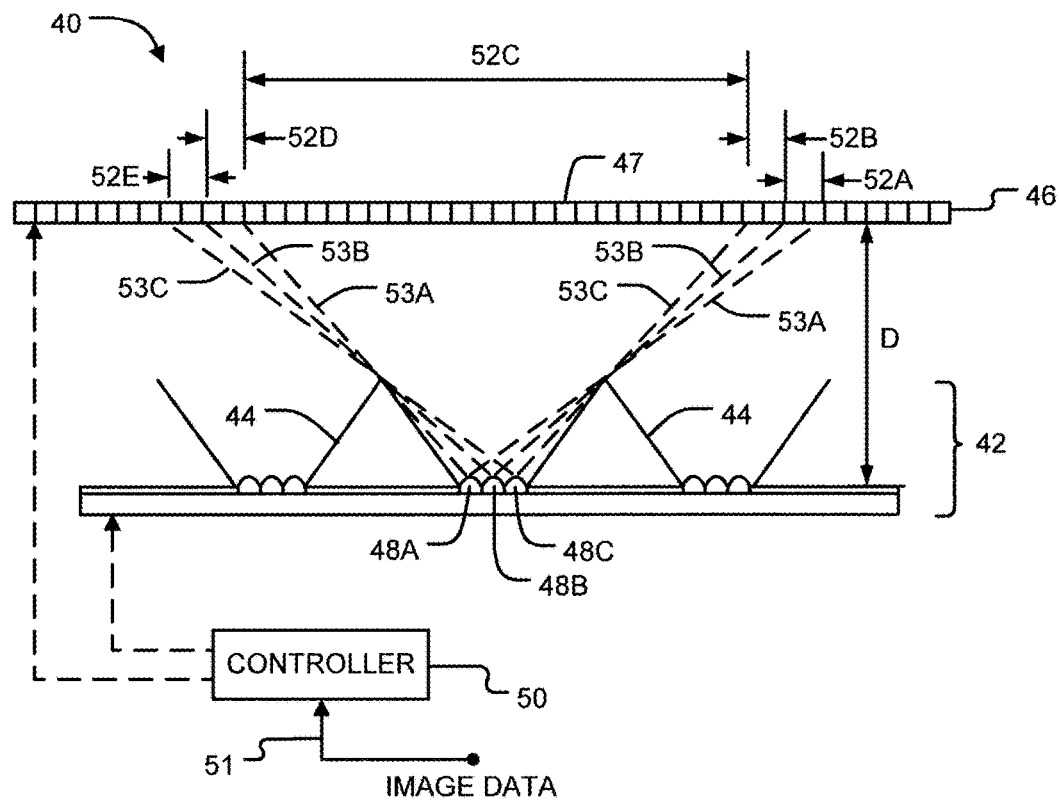
FIG. 4A shows a partial cross-section schematic view of a display like that of FIG. 2 wherein light sources of the backlight comprise three differently colored light emitters.

For example, FIG. 4A illustrates a variation of display 40 wherein each light source 48 comprises three primary color light emitters, 48A, 48B, and 48C. Light paths 53A, 53B and 53C represent the widest extent that light from each light emitter 48A, 48B and 48C respectively may travel without obstruction from inclined surfaces 44. As may be seen, the lateral spacing of each colored light emitter on the backlight 42 results in a lateral shift between the areas of illumination of each light emitter on the spatial light modulator. In other words, shadows produced by the inclined surfaces 44 surrounding light emitters, 48A, 48B, and 48C may result in colored fringes in the illumination pattern cast on the spatial light modulator 46. For example, in region 52A of spatial light modulator 46, light from light emitters 48B and 48C is blocked but light from light emitter 48A is not blocked. Similarly, in region 52E of spatial light modulator 46, light from light emitters 48A and 48B is blocked but light from light emitter 48C is not blocked. In regions 52B and 52D of spatial light modulator 46, light from light emitters 48C and 48A respectively is blocked. In the central region 52C of spatial light modulator 46, none of light emitters 48A, 48B and 48C is blocked.

Figure 4B:
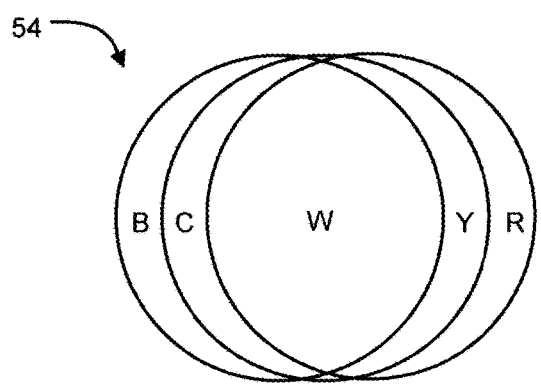
FIG. 4B illustrates an example illumination pattern made up of light from red, green and blue light emitters.

FIG. 4B illustrates an example color pattern 54 that could be produced on a spatial light modulator 46 where light emitters 48A, 48B and 48C in FIG. 4A are red, green and blue light emitters respectively and where inclined surfaces 44 surround the light emitters in a circle. The pattern 54 includes a blue fringe B, a cyan fringe C (green and blue overlapping), a white central region W (all three colors overlapping), a yellow fringe Y (red and green pattern overlapping) and a red fringe R. Such color fringing artifacts are potentially visible to the human eye and challenging to remove algorithmically (especially for moving image content).

For conventional (non-dual modulation) displays, a solution to eliminating these color fringes is to widely diffuse the light from the light sources across spatial light modulator 46. For dual-modulation displays this option is not desirable as the light distribution from each light source is preferably spatially contained so as to be able to have localized control (for example, local dimming) over the illumination of the spatial light modulator 46.

Figure 5:
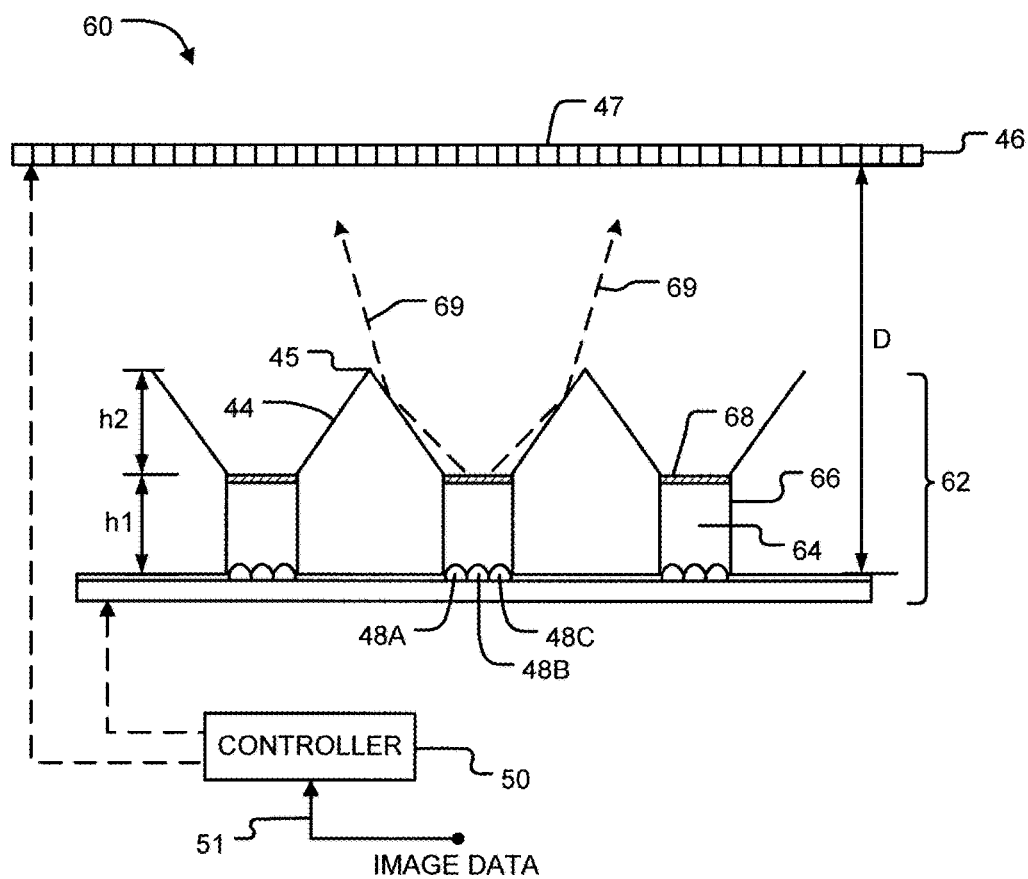
FIG. 5 shows a partial cross-section schematic view of a display having a backlight with light integrators and inclined reflecting surfaces according to an example embodiment of the present invention.

FIG. 5 illustrates a display 60 according to a particular embodiment of the present invention. Display 60 has a backlight 62 which illuminates spatial light modulator 46. In this embodiment, light from colored light emitters 48A, 48B and 48C (e.g. RBG light emitters) enters a light integrator 64. Inside the light integrator 64, the light from the emitters may reflect several times from walls 66 or other surfaces or scatterers to achieve thorough color mixing. The colored light is then emitted from light integrator 64 in a mixed state into region 27 of display 60. The exit 68 of light integrator 64 acts in effect as if it were a single light source emitting light of a homogenous color (e.g. white light or some other mixture of light from light sources 48A, 48B and 48C).

Backlight 62 of display 60 combines light integrators 64, for mixing light, with inclined surfaces 44, for spatially containing the distribution of the mixed light on spatial light modulator 46. Inclined surfaces 44 of backlight 62 may surround exits 68 of light integrators 64. As discussed above, the configuration of the inclined surfaces 44 appropriately shapes the PSF of the mixed light onto the pixels of a spatial light modulator 46. For example, inclined surfaces 44 in display 60 cause light rays 69 to be deflected inward toward spatial light modulator 46 such that they do not spread as widely from their originating light source 48 as they otherwise would.

Light integrator 64 may be generally cylindrical in shape or may be other shapes (e.g. rectangular, hexagonal, etc.) as long as a substantial amount of light mixing is achievable. In some embodiments, the diameter or width of light integrator 64 remains constant. In other embodiments, the diameter or width of light integrator 64 tapers and/or expands along its length. To enhance the scattering and intermixing of reflected light within light integrators 64, the walls 66 of light integrators 64 may be made of or coated with a diffusely reflective material. The interior body of light integrators 64 may be hollow (e.g. air) or may be a transparent solid material (e.g. an acrylic-based plastic such as polymethyl methacrylate/PMMA/Plexiglas™, glass, or the like). Such a clear solid material may have diffusing centers or diffusely reflecting particles embedded within it to enhance the mixing of light within light integrator 64. In some embodiments, light integrators 64 comprise two adjacent mediums having refractive indices suitable to create conditions for total internal reflection. In an example embodiment, light integrators 64 comprise transparent glass or plastic rods coated with white paint.

The entrance of light integrators 64 may be just open space (where the light integrator is hollow), or a surface of a solid material of the integrator that light from the emitters is incident on, or a more elaborate design to optimize the injection of light. For example, the entrance of light integrators 64 may comprise one or more lenses, a reflective chamber which collects light from the emitters and then injects the light into the pipe, a bundle of fibers coupled between the emitters and the light integrator, etc.). Light sources 48 coupled to the entrance of each light integrator 64 may comprise any number of light emitters of the same or different colors. For example, light sources 48 may comprise an array of RBG LEDs.

The exits 68 of light integrators 64 may also be shaped in a variety of ways to optimize the emission of light toward spatial light modulator 46 (e.g. shaped to provide a structured surface to increase diffusion, a lens, etc.). The exit 68 of light integrator 64 may comprise a sheet of a different transmissive material than the body of the light integrator or may comprise the same material as the body of the light integrator. For example, exit 68 may comprise or be configured to operate as a diffuser having an FWHM angle ranging from 30° to 80°. In some embodiments holographic diffusers are provided at exits 68.

As described above, FIGS. 6A-6D illustrate example configurations of backlights comprising light sources 48 and inclined surfaces 44. These configurations are also applicable to backlights that incorporate light integrators 64 such as shown in FIG. 5. In such cases, inclined surfaces 44 form reflective cavities (e.g. hexagonal, square, triangular, conical, etc.) around the exits 68 of light integrators 64.

As illustrated in FIG. 5, light integrators 64 have a height h1, inclined surfaces 44 have a height h2, and a total distance D is provided between light sources 48 and spatial light modulator 46. These dimensions may be varied as necessary to achieve desired mixing and shaping of light. By way of non-limiting example, heights h1 and h2 may each be in the range of 4 mm to 16 mm. Distance D may range from 25 mm to 50 mm for example. Generally, the greater the height h1, the more that light may intermix within light integrator 64. On the other hand, there is consumer demand for displays that are very thin front-to-back and so it is generally desirable to have D be as small as possible. In one particular embodiment, a display 60 having a height h1 of approximately 8 mm, a height h2 of approximately 8 mm, a distance D of approximately 35 mm, and a 80° FWHM diffuser at exit 68 of light integrators 64 was found to yield sufficiently good mixing to effectively eliminate visible color fringing at spatial light modulator 46.

The entrance of light integrators 64 is preferably large enough to receive all light emitted from light sources 48, but not so large as to leave openings through which significant amounts of reflected light may leak out. In some embodiments, any gaps existing between light sources 48 and the entrances of light integrators 64 are covered by a reflective surface to prevent emitted light from escaping. In some embodiments, the entrances of light integrators 64 operate like a one-way mirror allowing light to light to enter but preventing light from escaping. In other embodiments, light integrators 64 enclose light sources 48 entirely.

As mentioned above, backlights according to embodiments of this invention may comprise a plurality of independently-controllable light-emitting elements of various types. The light-emitting elements may include narrow-band light-emitting elements and/or broad-band light-emitting elements. Narrow-band band light-emitting elements may be of a plurality of colors that define a color gamut. For example, narrow-band light-emitting elements may comprise:

sources of red, green and blue light;
sources of red, green, blue and yellow light;
sources of light of three, four, five or more primary colors that define a color gamut;
etc.

By way of example, narrow-band band light-emitting elements may comprise light-emitting diodes (LEDs), other light-emitting semiconductor devices such as laser diodes, lasers, other sources of narrow-band band light such as light that has been filtered by narrow-band band filters, or the like. In some embodiments narrow-band band light-emitting elements each emit light that is monochromatic or quasi-monochromatic. In some embodiments the narrow-band band light-emitting elements emit light having a bandwidth of 50 nm or less.

Where a component (e.g. a light source, processor, controller, spatial light modulator, etc.) is referred to above, unless otherwise indicated, reference to that component should be interpreted as including as equivalents of that component any component which performs the function of the described component (i.e., that is functionally equivalent), including components which are not structurally equivalent to the disclosed structure which performs the function in the illustrated exemplary embodiments of the invention.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

Accordingly, the invention may be embodied in any of the forms described herein, including, but not limited to the following alternative embodiments.

According to an embodiment, a backlight for illuminating a spatial light modulator of a display includes a two-dimensional array of independently-controllable light sources, with the light sources located in cavities, the cavities each comprising one or more reflective surfaces inclined in a radially inward direction toward one of the light sources. According to a further embodiment, the inclined surfaces of adjacent light sources adjoin along upper edges forming apexes. According to a further embodiment, a radial slope of the inclined surfaces is substantially constant. According to a further embodiment, a radial slope of the inclined surfaces increases towards the apexes. According to a further embodiment, the inclined surfaces are arranged around the light sources in a regular pattern that tiles the backlight. According to a further embodiment, each light source is surrounded by six inclined surfaces and the cavities are arranged in a tiled hexagonal pattern. According to a further embodiment, each light source is surrounded by four inclined surfaces and the cavities are arranged in a tiled square pattern. According to a further embodiment, each light source has a group of light emitters having different spectral compositions. According to a further embodiment, point spread functions of neighboring light sources overlap at values greater than 40% of their maximum values and point spread functions of non-neighboring light sources overlap at values less than 5% of their maximum values. According to a further embodiment, point spread functions of neighboring light sources overlap at values greater than 45% of their maximum value and point spread functions of non-neighboring light sources overlap at values less than 1% of their maximum value. According to a further embodiment, the backlight further includes a controller that estimates total light intensities at a point on the spatial light modulator based on brightness levels of no more than a nearest light source and its immediate neighbors. According to a further embodiment, the light sources are arranged on the backlight in a regular two-dimensional grid and are separated from their nearest neighbors by a length. According to a further embodiment, the backlight further includes a controller that estimates total light intensities at a point on the spatial light modulator based on brightness levels of no more than the nearest four light sources.

According to an embodiment, a backlight for illuminating a spatial light modulator of a display includes a plurality of independently controllable light sources, each light source comprising a group of two or more light emitters having different spectral compositions, and a light integrator coupled to each light source such that the group of light emitters of the corresponding light source emits light into an entrance of the light integrator, and one or more inclined reflective surfaces inclining in a radially inward direction toward the spatial light modulator from an exit of each of the light integrators. According to a further embodiment, the light integrators are configured to mix the light received at their entrances and to emit mixed light toward the spatial light modulator. According to a further embodiment, the light integrators comprise diffusely reflective interior walls. According to a further embodiment, an interior body of the light integrators is hollow. According to a further embodiment, an interior body of the light integrators comprises a clear solid material. According to a further embodiment, the clear solid material comprises an acrylic-based plastic. According to a further embodiment, the light integrators comprise diffusing centers embedded in the clear solid material. According to a further embodiment, the light integrators are cylindrical. According to a further embodiment, the light integrators comprise transparent glass or plastic rods coated with white paint. According to a further embodiment, the exit of the light integrators comprises a transmissive diffuser. According to a further embodiment, the transmissive diffuser has a full-width at half-maximum (FWHM) angle in the range of 30 degrees to 80 degrees. According to a further embodiment, entrances of the light integrators comprise transmissive diffusers. According to a further embodiment, the light emitters of each light source comprise red, green and blue light emitters.

According to a further embodiment, a height of the light integrators is in the range of 4 mm to 16mm. According to a further embodiment, a height of the inclined surfaces is in the range of 4mm to 16 mm. According to a further embodiment, a distance between the light sources and the spatial light modulator is in the range of 25 mm to 50 mm.

According to an embodiment, a display includes a spatial light modulator and a backlight that includes one or more of the details discussed above.

Various embodiments or examples of the invention may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided herein along with accompanying figures. The detailed description is provided in connection with such examples, but is not limited to any particular example. The scope is limited only by the claims, and numerous alternatives, modifications, and equivalents are encompassed. Numerous specific details are set forth in the description in order to provide a thorough understanding. These details are provided as examples and the described techniques may be practiced according to the claims without some or all of the accompanying details. They are not intended to be exhaustive or to limit the invention to the precise forms disclosed, as many alternatives, modifications, equivalents, and variations are possible in view of the above teachings. For clarity, technical material that is known in the technical fields related to the examples has not been described in detail to avoid unnecessarily obscuring the description.

The description, for purposes of explanation, uses specific nomenclature to provide a thorough understanding of the invention. However, it will be apparent that specific details are not required in order to practice the invention. In fact, this description should not be read to limit any feature or aspect of the present invention to any embodiment; rather features and aspects of one example can readily be interchanged with other examples. Notably, not every benefit described herein need be realized by each example of the present invention; rather any specific example may provide one or more of the advantages discussed above. In the claims, elements and/or operations do not imply any particular order of operation, unless explicitly stated in the claims. It is intended that the following claims and their equivalents define the scope of the invention.

What is claimed is:

1. A backlight for a projector, comprising:
   a plurality of laser light sources;
   a plurality of light integrators, the plurality of light integrators positioned to receive light from the plurality of laser light sources and configured to perform color mixing of different colored light from the plurality of laser light sources to achieve a homogeneous color;
   a plurality of optical elements positioned to receive light from the plurality of light integrators and configured to holographically alter the received light; and
   wherein the plurality of optical elements contributes to the generation of an array of light emissions comprising Point Spread Functions (PSFs) having a desired range of full-width at half-maximum angles.

2. The backlight of claim 1 wherein the plurality of optical elements is configured to operate on an array of light emissions comprising a Point Spread Function (PSF) have a range of full-width at half-maximum angles from approximately 30 degrees to 80 degrees.

3. The backlight of claim 1 wherein the backlight further comprises a plurality of optical fibers, the plurality of optical fibers receiving light from the plurality of laser light sources and transmitting the light to the plurality of light integrators.

4. The backlight of claim 1 wherein the light from the plurality of optical elements is controlled so that adjacent light emissions of the array of light emissions mix at a ratio greater than a first desired amount of peak value within an area covered by the full width at half maximum of the PSFs.

5. The backlight of claim 4 wherein the first desired amount of peak value is approximately 45%.

6. The backlight of claim 4 wherein the light from the plurality of optical elements is configured so that next nearest neighbor light emissions of the array of light emissions mix at a ratio less than a second desired amount of peak value within an area covered by the full width at half maximum of the PSFs.

7. The backlight of claim 6 wherein the second desired amount of peak value is approximately 5%.

8. A method for mixing light from a plurality of laser light sources for illuminating a projector, comprising:
   inputting light from the plurality of laser light sources into a plurality of light integrators;
   performing, by the plurality of light integrators, color mixing of different colored light from the plurality of laser light sources to achieve a homogeneous color;
   transmitting light from the plurality of light integrators to a plurality of holographic diffusers; and
   holographically changing the transmitted light forwarded as an array of light emissions comprising a Point Spread Function (PSF) having a desired range of full-width half-maximum angles.

9. The method of claim 8 wherein the method further comprises illuminating a modulator with holographically diffused light.

10. The method of claim 8 wherein the array of light emissions comprising a Point Spread Function (PSF) have a range of full-width at half-maximum angles from approximately 30 degrees to 80 degrees.

11. The method of claim 8 wherein adjacent light emissions of the array of light emissions mix at a ratio greater than a first desired amount of peak value within an area covered by the full width at half maximum of the PSFs.

12. The method of claim 11 wherein the first desired amount of peak value is approximately 45%.

13. The method of claim 8 wherein next nearest neighbor light emissions of the array of light emissions mix at a ratio less than a second desired amount of peak value within an area covered by the full width at half maximum of the PSFs.

14. The method of claim 13 wherein the second desired amount of peak value is approximately 5%.

15. A projector system comprising:
   a backlight comprising:
      a plurality of laser light sources;
      a plurality of light integrators, the plurality of light integrators positioned to receive light from the plurality of laser light sources and configured to perform color mixing of different colored light from the plurality of laser light sources to achieve a homogeneous color;
      a plurality of optical elements positioned to receive light from the plurality of light integrators and configured to holographically alter the received light; and
      wherein the plurality of optical elements contributes to the generation of an array of light emissions comprising Point Spread Functions (PSFs) having a desired range of full-width at half-maximum angles; and
   a modulator, the modulator illuminated light by the backlight.

16. The projector system of claim 15 wherein the plurality of optical elements comprises a plurality of holographic diffusers.

17. The projector system of claim 15 wherein the plurality of optical elements is configured to operate on an array of light emissions comprising a Point Spread Function (PSF) having a range of full-width at half-maximum angles from approximately 30 degrees to 80 degrees.

18. The backlight of claim 1, further comprising:
   a plurality of inclined surfaces that reflect the plurality of light emissions from the plurality of optical elements.

19. The backlight of claim 18, wherein the plurality of inclined surfaces form a plurality of cavities around the plurality of laser light sources.

20. The backlight of claim 19, wherein the plurality of cavities comprise a plurality of hexagonal cavities.

* * * * *